United States Patent [19]

Lauck

[11] 4,116,577
[45] Sep. 26, 1978

[54] FLOW SENSING AUXILIARY PUMP BY-PASS VALVE

[75] Inventor: John A. Lauck, Benton Harbor, Mich.

[73] Assignee: National Machine Company, Inc., Stow, Ohio

[21] Appl. No.: 779,482

[22] Filed: Mar. 21, 1977

[51] Int. Cl.² ............................................. F04B 49/00
[52] U.S. Cl. ...................................... 417/286; 60/405
[58] Field of Search .......................... 417/286; 60/405; 180/133

[56] References Cited

U.S. PATENT DOCUMENTS

| 2,440,371 | 4/1948 | Holley, Jr. | 417/286 |
| 3,613,818 | 10/1971 | Schubert et al. | 180/133 |
| 3,625,240 | 12/1971 | MacDuff | 180/133 X |
| 3,952,510 | 4/1976 | Peterson | 60/405 X |

FOREIGN PATENT DOCUMENTS 1,246,014  10/1960  France ..................................... 417/286

*Primary Examiner*—Carlton R. Croyle
*Assistant Examiner*—Leonard E. Smith
*Attorney, Agent, or Firm*—Blanchard, Flynn, Thiel, Boutell & Tanis

[57] ABSTRACT

A valve for use in a system having a source of fluid, two pumps and means responsive to a change in the flow condition of the fluid caused by a lack of proper performance of one of the pumps to effect a utilization of the fluid pumped by the other pump. The valve includes a body having a pair of inlet ports and an outlet port spaced from the inlet ports. One of the pumps is connected to a first inlet port with the other pump being connected to a second inlet port. A passageway is provided in the valve body and extends between and is in fluid communication with the pair of inlet ports and the outlet port. A first normally closed valve is provided in the valve body for controlling the main flow of fluid from one of the pumps and is openable in response to a predetermined pressure differential in the fluid at the first inlet port and the outlet port. The first normally closed valve is closed, in addition to the normal closing thereof, in response to a fluid flow from the other pump. A second normally closed valve is provided in the valve body for controlling the return flow of the fluid from the other pump to a reservoir therefor. The second valve is openable in response to a predetermined pressure differential in the fluid at the first inlet port and the outlet port to effect a return of fluid to the reservoir. The second valve is closed, in addition to the normal closing thereof, in response to a drop in the predetermined pressure differential in the fluid to effect both a blocking of the return flow of the fluid to the reservoir and initiating a flow of fluid from the other pump to the outlet port.

7 Claims, 3 Drawing Figures

U.S. Patent  Sept. 26, 1978  Sheet 1 of 2  4,116,577
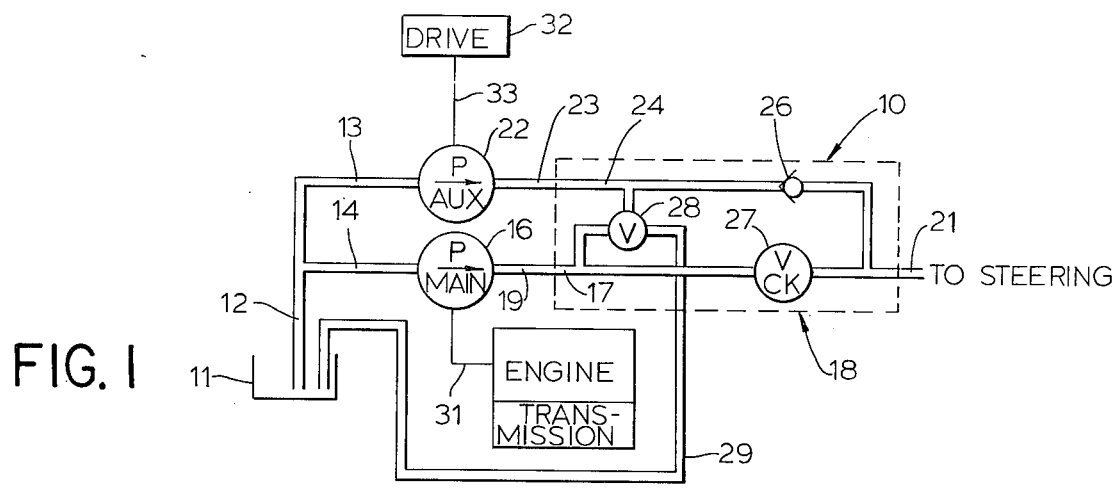
FIG. I
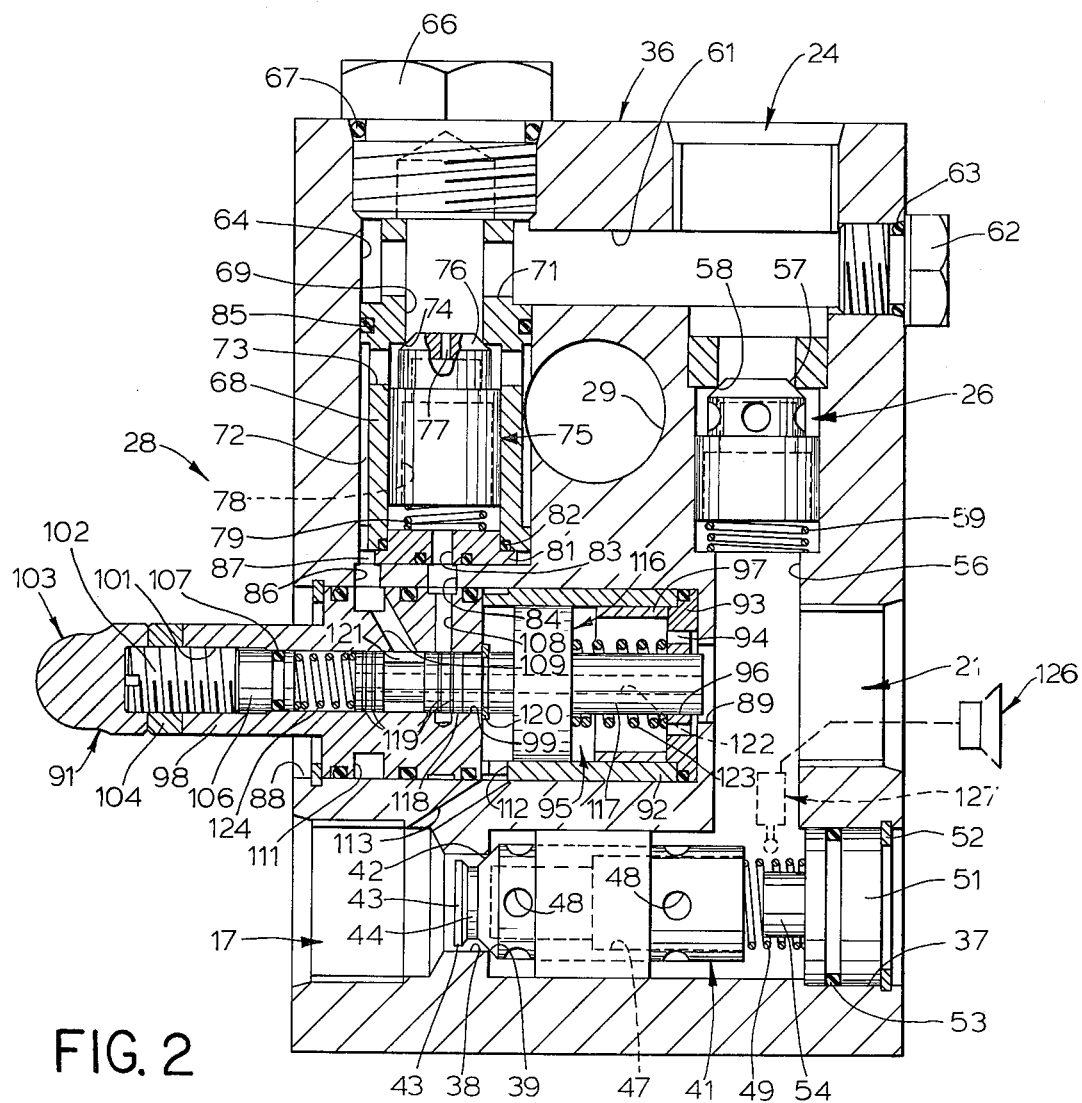
FIG. 2

FLOW SENSING AUXILIARY PUMP BY-PASS VALVE

FIELD OF THE INVENTION

This invention relates to a valve and, more particularly, relates to a valve for use in vehicles having a pair of pumps, one pump being a primary pump and the other pump being an auxiliary pump the fluid from which is utilized upon a failure in the operation of the primary pump to maintain an emergency control of the vehicle during periods of time that a lack of proper performance exists in the primary pump.

BACKGROUND OF THE INVENTION

The presently known warning systems on vehicles, particularly large earth moving type vehicles, namely the off-the-road rubber tired machinery such as road scrapers, front end loaders and the like, is unsatisfactory in that there is a lack of automatic equipment which will effect a maintenance of the hydraulic system in operable condition should there be a failure in the primary pumping system or driving mechanism therefor. The presently known systems have usually three methods to warn the operator of a primary pump failure. One type of warning system is a buzzer which warns the operator that there is a failure in the primary steering system. The second type of warning system is a red light which is supposed to be noticed by the operator to warn him of a primary steering failure. The third type of warning system is the operator's inability to steer the vehicle. In all three instances, the operator must manually operate a switch to turn on an emergency pumping system to reactivate the hydraulics to supply power to the primary steering system. In some cases, the operator will panic as a result of events happening too fast for him to remember to manually activate the switch and, as a result, an accident is a highly likely occurrence, Accordingly, it is desirable to have an automated control which automatically effects a utilization of fluid from an emergency pumping system when the flow of fluid from the primary pumping system falters.

At present, there are three types of drive systems for the emergency pumps. There are D.C. motor driven emergency pumps which become electrically activated to supply fluid into the primary fluid circuit when the primary pump fails or the driving mechanism therefor stops. The D.C. motor driven emergency pump is electrically activated by either a pressure switch or a flow sensing switch. Another type of drive for emergency pumps is the provision of a ground engaging wheel provided on the vehicle or a transmission device which is driven from the rear axle or gear box and operates only when the vehicle is in motion. As the vehicle starts to move and drive the auxiliary pump, the flow of fluid caused by the primary pump dictates whether the emergency pump flow is required. A relief valve is utilized in the system to dump the emergency pump flow back into the reservoir when it is not needed and to effect a utilization of the flow from the emergency pump when the flow from the primary pump is too low to maintain a proper control of the vehicle. A still further type of drive or control for emergency purposes is the provision of an accumulator system which utilizes an accumulator in the fluid circuit to store energy which can be called upon at a later time if the primary pump or engine drive therefor fails. This system is obviously very limited in time because of the limited capacity of the accumulator.

My U.S. Pat. No. 3,923,423 relates to a valve wherein the auxiliary pump is normally off and is electrically operated in response to an insufficient fluid flow from the primary pump. I have designed a new valve for use in systems wherein the emergency pump is continuously driven either by an electrical motor to which electrical energy is supplied by the vehicle battery and/or electrical generating system or is driven by a ground engaging wheel or by a transmission device connected to the rear axle and is operative only when the vehicle is in motion.

Accordingly, it is an object of this invention to provide a valve for automatically controlling the utilization of the fluid from an emergency pumping system, which is operated only when the vehicle is in motion, when the flow rate of the fluid from the primary pumping system is slightly less than the flow rate through the valve at engine idle speed where the engine is utilized to drive the primary pumping system. It is a further object of this invention to provide a valve which is compact and which will be utilizable in existing systems with a minimum of installation considerations. It is a further object of this invention to provide a valve which is easily manufactured and at a minimum of cost and is easily maintained in satisfactory operating conditions. It is a further object of this invention to provide a valve which is operable with a minimum of pressure surges and pressure differentials occurring in the line.

SUMMARY OF THE INVENTION

In general, the objects and purposes of the invention are met by providing a valve for use in a vehicle having a source of fluid, a first pumping means operative by a driving mechanism and a second auxiliary fluid pumping means continuously driven by a second driving mechanism during motion of the vehicle. Means responsive to a change in the flow condition of the fluid caused by a lack of proper performance of the first fluid pumping means is provided to effect a utilization of the fluid pumped by the second fluid pumping means. The valve includes a body having a pair of inlet ports and an outlet port spaced from the inlet ports. The first pumping means is connected in circuit with one of the pair of inlet ports and the second pumping means is connected in circuit with the other inlet port. Passageway means are provided in the body and located between and in fluid communication with the pair of inlet ports and the outlet port. A first normally closed valve means is provided in the passageway means for controlling the main flow of fluid from the first pumping means to the outlet port and being openable in response to a predetermined pressure differential in the fluid at one inlet port and the outlet port. The first normally closed valve means is closed, in addition to the normal closing thereof, in response to a fluid flow from the second fluid pumping means. A second normally closed valve means is provided in the passageway means for controlling the return flow of fluid from the second pumping means to a reservoir therefor. The second normally closed valve means is openable in response to a predetermined pressure differential in the fluid at the one inlet port and the outlet port to effect a return of fluid to the reservoir. The second normally closed valve means is closed, in addition to the normal closing thereof, in response to a drop in the predetermined pressure differential in the fluid to effect both a blocking of the return flow of fluid to the reservoir and a flow of fluid from the second fluid pumping means to the outlet port.

BRIEF DESCRIPTION OF THE DRAWINGS

Other objects and purposes of this invention will be apparent to persons acquainted with valves of this general type upon reading the following specification and inspecting the accompanying drawings, in which:

In the drawings:

FIG. 1 is a schematic fluid circuit diagram for a system utilized in a vehicle to control the steering thereof;

FIG. 2 is a central sectional view through the valve; and

DETAILED DESCRIPTION

Figure 3:
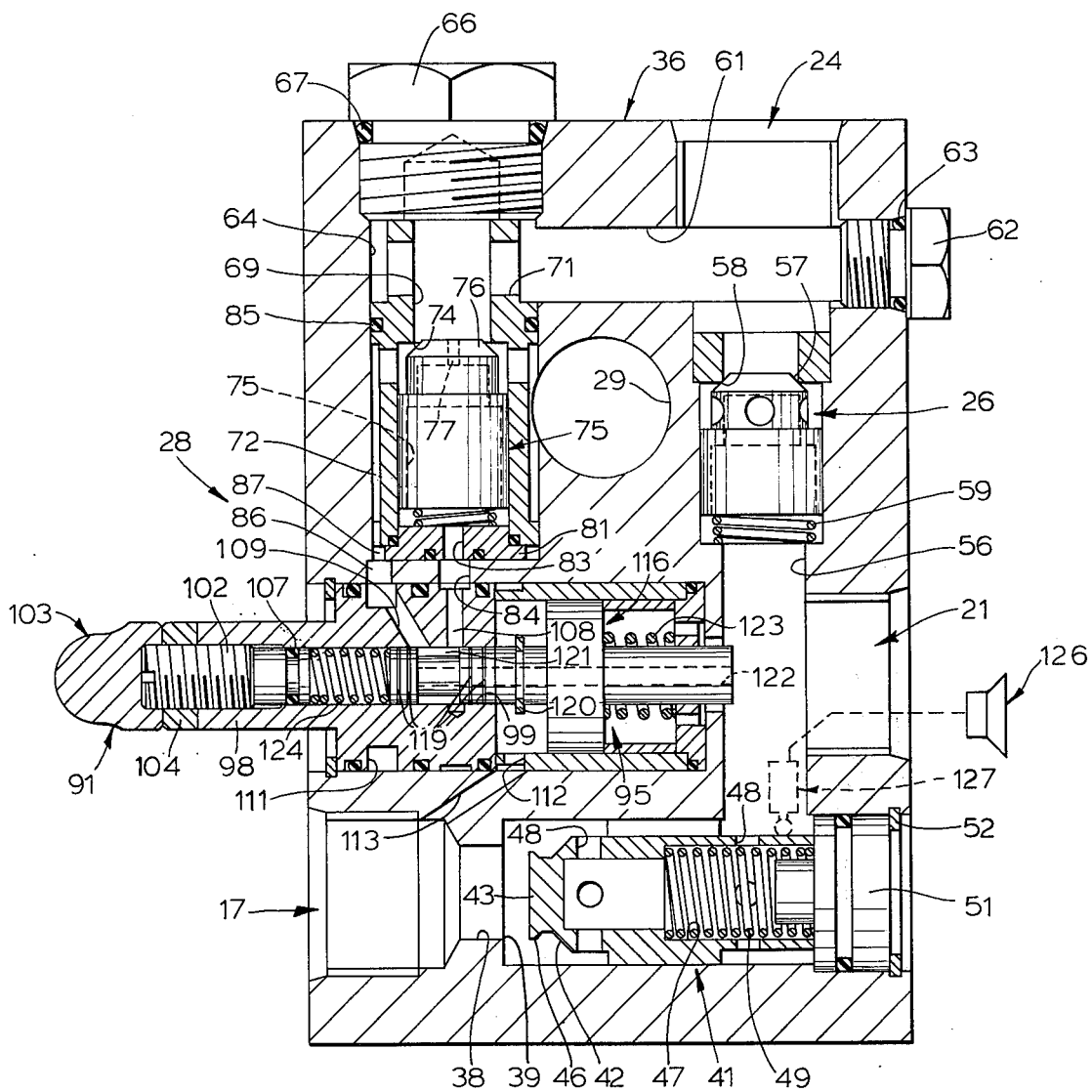
FIG. 3 is an illustration similar to FIG. 2 except with the valve components in a slightly shifted position.

While the invention disclosed herein arose primarily out of a need to improve the automatic emergency control system controlling the steering system on large rubber tired off-the-road vehicles, it is to be understood that the valve disclosed hereinafter is utilizable for controlling hydraulically actuated brakes on a vehicle and numerous other fluid operated systems wherein the pump is operated in response to vehicle motion and wherein it is necessary that the fluid from the secondary pumping system be automatically utilized upon the failure of the primary pumping system. Accordingly, the following disclosure is not to be limiting to the disclosed environment.

Referring now to the drawings, particularly FIG. 1, a fluid circuit 10 for controlling the operation of a steering system on the vehicle is composed of a reservoir 11, a main suction pipe 12 branching into a pair of suction pipes 13 and 14. The inlet port to the main pump 16 is connected to the suction pipe 14. The outlet port from the main pump 16 is connected to an inlet port 17 to a valve 18 through a pipe 19. An outlet port 21 from the valve 18 is connected to the primary steering system in the vehicle.

The auxiliary pump 22 has an inlet which is connected to the suction pipe 13 and an outlet that is connected through a pipe 23 to a second inlet port 24 on the valve 18. The inlet port 24 is connected through a passageway and check valve 26 to the outlet port 21 and thence to the primary steering system in the vehicle. The valve 18 also includes, in addition to the check valve 26, another check valve 27 positioned between the inlet port 17 and the outlet port 21. A return flow control valve 28 has two inlets thereto, namely an inlet connected in fluid circuit with the inlet port 17 and another inlet connected in fluid circuit with the second inlet port 24 to the valve 18. The outlet port from the valve 28 is connected to a return line 29 for facilitating a return of fluid to the reservoir 11.

After the engine is started, the main pump 16 is driven by the engine through the gear train 31 to supply fluid from the reservoir 11 through the valve 18 to the primary steering system. The auxiliary pump 22 is driven by a drive 32 through a gear train 33 in response to an electrical energization of the drive 32 or in response to vehicle motion. The primary criteria for the drive 32 is that it be in continuous operation at all times, particularly during periods that the vehicle is in motion.

Referring now to FIG. 2, the valve 18 is composed of a valve body 36 in which are provided the aforementioned inlet ports 17 and 24 and the outlet port 21. A bore 37 is provided in the valve body 36 axially aligned with the inlet port 17. A narrower opening 38 is provided in the bottom of the bore 37 and opens outwardly into the aforementioned inlet port 17 and, therefore, provides fluid communication between the inlet port 17 and the bore 37. The edge between the narrow passageway 38 and the bore 37 defines a valve seat 39.

A valve member 41 is mounted for reciprocal movment in the bore 37 toward and away from the valve seat 39. The left end of the valve member 41 has a chamfered face 42 thereon defining a valve face. The valve face 42 is adapted to engage the valve seat 39. A projection 43 on the left end of the valve member 41 projects leftwardly into the narrow passageway 38 when the valve face engages the valve seat. The projection 43 has an annular groove 44 therein defining a peripheral edge 46 at the forwardmost end thereof. The peripheral edge 46 of the projection 43 is spaced from the internal wall of the narrow passageway 38 a small distance, such as 0.062 inches. The peripheral edge 46 is also spaced leftwardly across the groove 44 from the valve face 42. A recess 47 is provided in the left end of the valve member 41. A plurality of holes 48 are provided in the peripheral surface of the valve member 41 to the right of the valve face 42 and communicate with the recess 47. In addition, one end of a spring 49 is received in the recess 47.

A plug 51 is provided in the outer end of the bore 37 in the valve body 36 to close the outer end of the bore 37. The plug 51 is maintained in a fixed position by a slip ring 52. A seal 53 is provided in an annular groove in the plug 51 to prevent seepage of fluid past the plug. The plug 51 has a projection 54 on the internal side thereof aligned with the central axis of the narrow passageway 38 and serves as a guide around which the other end of the spring 49 is mounted and abuts.

Another bore 56 is provided in the valve body 36 and, in this particular embodiment, is aligned with and communicates with the second inlet port 24. The bore 56 communicates with the bore 37 and opens outwardly of the valve body at the outlet port 21 which also communicates therewith. The aforementioned check valve 26 is mounted in the bore 56 and has a valve face 57 thereon engaging a valve seat 58 mounted in the bore 56. The check valve 26 is urged into the closed position by a spring 59. The usual holes are provided in the body of the check valve member 26 to facilitate the flow of fluid through the center of the check valve body after the valve face 57 has been moved away from the valve seat 58.

A further bore 61 is provided in the valve body 36 and, in this particular embodiment, intersects the bore 56 and inlet port 24 and extends at a right angle to the axis of the bore 56 and is located between the inlet port 24 and the valve seat 58 for the check valve 26. A plug 62 having a seal 63 thereon is provided for closing the outer end of the bore 61.

A further bore 64 is provided in the valve body 36 and, in this particular embodiment, intersects the bore 61 and extends parallel to the bore 56. A plug 66 having a seal 67 thereon is utilized to close off the outer end of the bore 64. The bore 64 intersects an edge of the outlet to the return line 29 also provided in the valve body 36. The bottom of the bore 64 may be of any convenient type of construction to facilitate proper machining thereof. In this particular embodiment, the bottom of the bore 64 is flat and perpendicular to the longitudinal axis of the bore 64. A sleeve 68 having a central opening 69 therethrough is received in the bore 64 and rests on the bottom wall thereof. A plurality of holes 71 are provided in the end of the sleeve 68 spaced from the bottom wall and are generally aligned with the bore 61. The holes 71 are provided in a portion of the sleeve which is substantially less in diameter than the diameter of the bore 64 to facilitate the flow of fluid around the periphery of the sleeve at this location and to further facilitate the entry of fluid into all of the holes 71 provided in the sleeve 68. The periphery of the sleeve 68 adjacent the return line port 29 is also less than the diameter of the bore 64 to define a spacing 72. A plurality of holes 73 are provided in the sleeve 68 to provide fluid communication between the central opening 69 and the spacing 72. The holes 73 open into a larger diameter portion of the central opening 69 than do the holes 71. As a result, a valve seat 74 is defined by the edge between the different diameter portions of the central opening 69.

A normally closed valve member 75 is reciprocally mounted in the larger diameter portion of the central opening 69. A valve face 76 thereon is adapted to engage the valve seat 74. An orifice 77 having a diameter in the range of 0.015 to 0.020 inches is provided centrally of the valve face 76 and extends in a direction parallel to the axis of the valve member 75. A recess 78 is provided in the valve member 75 and communicates with the inner end of the orifice 77. One end of a spring 79 is received in the recess 78 with the other end thereof engaging an end plate 81 securely fastened to an end of the sleeve 68 remote from the end having the holes 71 therein. The connection between the end plate 81 and sleeve 68 is sealed by a seal 82. A spacing is provided between the end of the valve member 75 remote from the valve face 76 and the end plate 81. In this particular embodiment, the end plate 81 rests on the bottom of the bore 64.

An opening 83 is provided in the end plate 81 and is, in this particular embodiment, coaxial with the central axis of the valve member 75. The hole 83 is axially aligned with a further hole 84 provided in the bottom wall of the bore 64. A further hole 86 is provided in the bottom wall of the bore 64 but is spaced radially outwardly from the central hole 84 and communicates with a notch 87 or the like provided in the edge of the end plate 81. The notch 87 provides fluid communication between the hole 86 and the spacing 72 around the periphery of the sleeve 78.

In addition to the foregoing construction of the sleeve 68, an annular groove is provided in the body of the sleeve 68 to receive an annular seal ring 85 therein to isolate the volume defined by the spacing 72 and the return line 29 from the volume surrounding the sleeve 68 adjacent the holes 71 and in the bore 61. The seal ring 85 is needed because the pressure of the fluid in the spacing 72 will be, in some instances, different than the pressure in the bore 61.

A further bore 88 is provided in the valve body 36 and extends generally parallel to the axis of the bore 37 and the inlet port 17. The bottom end of the bore 88 has a hole 89 in the bottom end thereof providing communication between the bore 88 and the bore 56 and thence the outlet port 21.

A flow sensing pilot valve control housing 91 is snugly recieved in the bore 88 and is retained therein by the usual clip ring type construction. The pilot valve control housing 91 has a sleeve part 92 having a central opening therethrough and an end plate 93 fixedly secured to the sleeve 92. The end plate 93 has a central recessed portion having a plurality of holes 94 therein. In other words, the recessed portion on the end plate 93 defines a spacing between the bottom of the bore 88 and a mutually facing surface on the end plate 93 to facilitate the passage of fluid through the hole 89 and into the holes 94 in the end plate 93. A central and larger hole 96 is provided in the recessed part of the end plate 93 and the axis thereof is coaxial with the central axis of the sleeve 92. A sleevelike stop 97 is mounted internally of the sleeve 92 and rests against the end plate 93. The purpose of the stop 97 will be explained in detal below.

A valve body 98 is secured to the end of the sleeve 92 remote from the end plate 93. The spacing between the right end of the valve 98 and the end plate 93 defines a chamber 95. The valve body 98 has a central bore 99 therethrough extending coaxially with the axis of the hole 96 and the central axis of the sleeve 92. The bore 99 has an internally threaded portion 101 adjacent the left end thereof and an adjusting screw 102 is threadedly engaged therewith. A cap 103 is threadedly engaged with the outer end of the adjusting screw 102. A locking nut 104 is provided to lock the adjusting screw 102 in a desired fixed position. The adjusting screw 102 has an extended portion 106 thereon which has an annular groove receiving a sealing ring 107 therein to prevent the passage of fluid in the bore 99 outwardly of the screw 102.

A passageway 108 is provided in the valve body 98 and provides fluid communication between the bore 99 and the hole 84 in the bottom end of the bore 64. An additional opening 109 is provided in the valve body 98 to provide further fluid communication between the bore 99 and an annular groove 111 provided in the external surface of the valve body 98. The annular groove 111 is aligned with the hole 86 provided in the bottom wall of the bore 64. In addition, a hole 112 is provided in the sleeve 92 adjacent the right end of the valve body 98 and communicates with a passageway 113 in the valve body 36 to provide fluid communication between the inlet port 17 and the chamber 95. In this particular embodiment, the passageway 113 opens into the inlet port 17 on the side of the valve seat 39 remote from the plug 51.

A piston 116 is reciprocally snugly slidably mounted in the chamber 95. The piston 116 has a pair of rodlike extensions 117 and 118 extending outwardly therefrom coaxially with the central axis of the piston 116. The piston 116 divides the chamber 95 into two parts. The rod extension 117 is snugly received in and guided by the hole 96 in the end plate 93 of the valve control housing 91. The rod extension 118 is snugly received in and guided by the bore 99 in the valve body 98. A portion of the rod extension 118 is substantially less in diameter than the diameter of the bore 99 to define a spacing 121 between the periphery of the rod extension 118 and the inner surface of the bore 99. A plurality of sets of axially spaced fluid pressure equalizing annular grooves 119 are provided on the rod extension 118 and straddle the portion defining the spacing 121. The length of the spacing 121 is equal to the spacing between the locations where the passageways 108 and 109 open into the bore 99. As a result, when the spacing 121 is properly situated, fluid communication will be possible between the passageways 108 and 109 through the spacing 121. A snap ring 120 is fastened to the rod extension 118 to limit the movement of the piston 116 to the left.

A spring 123 is received in the chamber 95 and extends between the piston 116 and the end wall 93 of the valve control housing 91. A further spring 124 is mounted in the bore 99 and extends beween the extension 106 of the screw 102 and the left end of the rod extension 118.

A central opening 122 extends through the rod extensions 117, 118 and the piston 116 so that fluid pressure present in the bore 56 and outlet port 21 will be presented to the chamber between the extension 106 and the left end of the rod extension 118. As a result, the diameter of the rod extensions 117 and 118, which diameters are equal, are balanced so that the piston 116 is truly responsive to the pressure differential of the fluid between the inlet port 17 and the outlet port 21.

The adjusting screw 102 can be adjusted to vary the spring force of the spring 124. As a result, the variable conditions of the spring 123 can be accurately compensated for through an adjustment of the adjusting screw 102.

OPERATION

Although the operation of the device embodying the invention has been indicated somewhat above, a brief summary of the operation will be given below for convenience.

For purposes of this discussion, it will assumed that the vehicle engine has been started and is operating. During idle, the main pump 16 is drawing a supply of fluid from the reservoir 11 through the suction pipes 12 and 14 and delivering same through the pipe 19 to the inlet port 17 of the valve 18. The fluid will flow through the inlet port 17 and into the annular groove 44 between the peripheral edge 46 and the narrow passageway 38. The initial flow of fluid will move the valve face 42 away from the valve seat 39. As the flow continues to increase, a sufficient pressure drop will occur across the orifice between the peripheral edge 46 and the internal surface of the narrow passageway 39 to effect a compression of the spring 49 so that the valve member 41 is moved so that the right end thereof comes into engagement with the stop defined by the plug 51 (see FIG. 3). In this position, the peripheral edge 46 is moved out of the narrow passageway 39 to minimize the flow restriction generated by the presence of the peripheral edge within the narrow passageway 39.

The valve 28 (FIG. 1) is comprised of the valve member 75 and the pilot valve 91. The pressure differential between the inlet port 17 and the outlet port 21 caused by the pressure drop across the valve member 41 will cause an effective shifting of the piston 116 to the right against the stop 97 and against the force of the spring 123. This will cause a shifting of the rod extension 118 in the bore 99 to bring the spacing 121 into alignment with the radially inner ends of the two passageways 108 and 109.

Heretofore, it has been assumed that the drive 32 has been properly activated in response to the motion of the vehicle to activate the pump 22 to draw fluid from the reservoir 11 through the suction pipe 12 and 13 and deliver same to the second inlet port 24 through the pipe 23. As a result, pressurized fluid from the auxiliary pump 22 will be presented to the bore 61 and to the interior of the small diameter portion of the central opening 69 in the sleeve 68. Since the passageway 109 is now open to the passageway 108 through the spacing 121, fluid will be permitted to flow from the portion of the larger diameter portion of the central opening 69 in the sleeve 68 adjacent the end plate 81. The pressure of the fluid from the auxiliary pump 22 will be sufficient to move the valve member 75 to the position illustrated in FIG. 3 so that the valve face 76 thereon is spaced from the valve seat 74. Fluid will flow now from the bore 61 into the spacing 72 through the holes 71 and 73 and thence to the return line 29. The pressure differential between the fluid at the outlet port 21 and the pressure in the return line 29 will be sufficient to maintain the check valve 26 in the closed position.

If the flow sensing pilot valve 91 senses a decrease in the rate of flow past the valve member 41 thereby diminishing the pressure differential between opposite sides of the piston 116, the spring 123 will return the piston 116 to the position illustrated in FIG. 2 and the spacing 121 between the two sets of grooves 119 will move out of alignment with both of the passageways 108 and 109. As a result, the pressure drop across the orifice 77 in the valve member 75 is diminished and the spring 79 will return the valve member 75 to the initial closed position illustrated in FIG. 2 wherein the valve face 76 engages the valve seat 74 to close off the flow of fluid from the auxiliary pump to the return line 29. In addition, the pressure drop across the check valve 26 will now be sufficient enough to compress the spring 59 to move the valve face 57 on the check valve 26 away from the valve seat 58 so that fluid from the auxiliary pump 22 will supply pressurized fluid to the outlet port 21 through the bore 56. The spring 49 will have, by this time, returned the valve member 41 to the closed position wherein the valve face 42 engages the valve seat 39. A pressurization of the bore 37 by fluid entering same from the second inlet port 24 will further provide the necessary impetus to close the fluid communication between the bore 37 and the inlet port 17.

The interesting facet of my invention is the provision of a system which is not subject to the utilization of seals which have a tendency to stick at the critical location in the system, particularly in and around the spool 116 and rod extensions 117 and 118. Thus, fluctuations in the differential pressure required to effect a smooth transition from the use of the fluid from the main pump 16 to the use of fluid from the auxiliary pump 22 will be held at a minimum but yet the flow sensing pilot valve control 91, particularly the piston 116 therein will be held against the stop 97. In addition, my valve is responsive to pressure differentials of 3 to 5 psi to effect actuation thereof. As a result, erratically occurring pressure differentials outside and above the aforementioned range have been effectively eliminated by my valve construction.

In addition, I have provided a warning signal 126 to the operator so that the utilization of the fluid from the auxiliary pump is noted. In this embodiment, I have provided a simple switch 127 responsive to the valve 41 moving to the closed position. The switch 127 is only schematically shown but could be identical to the microswitch and mounting structure therefor disclosed in my aforementioned U.S. Pat. No. 3,923,423.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are as follows:

1. A valve for use in a system having a source of fluid, a first fluid pumping means operative by a driving mechanism and a second auxiliary fluid pumping means driven by a second driving mechanism and means responsive to a change in the flow condition of said fluid caused by a lack of proper performance of said first fluid pumping means to effect a utilization of the fluid pumped by said second fluid pumping means, said valve comprising:

means defining a body having a pair of inlet ports and an outlet port spaced from said inlet ports, said first pumping means being connectible in circuit with one of said pair of inlet ports, said second pumping means being connectible in circuit with the other one of said pair of inlet ports;

passageway means located in said body and between and in fluid communication with said pair of inlet ports and said outlet port;

first normally closed valve means in said passageway means for controlling the main flow of fluid from said first pumping means to said outlet port and being openable in response to a predetermined pressure differential in said fluid at said one of said inlet ports and said outlet port, said normally closed valve means being closed, in addition to said normal closing thereof, in response to a fluid flow from said second fluid pumping means; and second normally closed valve means in said passageway means for controlling the return flow of fluid from said second pumping means to a reservoir therefor and being openable in response to a predetermined pressure differential in said fluid at said one of said inlet ports and said outlet ports to effect a return of fluid to said reservoir, said second normally closed valve means being closed, in addition to said normal closing thereof, in response to a drop in said predetermined pressure differential in said fluid to effect (1) a blocking of the return flow of fluid to said reservoir and (2) a flow of fluid from said second fluid pumping means to said outlet port.

2. A valve according to claim 1, wherein said first normally closed valve means includes fluid flow sensing means thereon and effecting a closing thereof in response to fluid flow less than a predefined minimum level.

3. A valve according to claim 1, wherein said second normally closed valve means includes chamber means, a first passageway communicating with said one of said inlet ports and opening into said chamber means adjacent one end thereof, a second passageway communicating with said outlet port and opening into said chamber means adjacent the other end thereof and piston means reciprocally movable in said chamber means and further including a flow control pilot valve means operable in response to the position of said piston means in said chamber means for effecting a control of the return flow of fluid from said second pumping means to said reservoir.

4. A valve according to claim 3, wherein said flow control pilot valve means includes a further chamber means communicating with and located between said other one of said pair of inlet ports and said reservoir, a normally closed first valve member reciprocally mounted in said further chamber means, said first valve member having a bleed orifice extending therethrough, a third passageway communicating between said further chamber means and said reservoir and opening into said further chamber means adjacent an end thereof remote from the position of said first valve member when in the closed position to block fluid flow to said reservoir, said piston means includes a second valve member movable therewith, said second valve member being movable into and out of fluid blocking relation with said third passageway, said second valve member when in said blocking relation effecting a holding of said first valve member in the closed position.

5. A valve according to claim 4, including check valve means positioned in said passageway means from said other of said pair of inlet ports and said further chamber means to said outlet port to prevent fluid flow from said outlet port to said other inlet port and said further chamber means.

6. A valve according to claim 4, wherein said piston means has an opening extending axially therethrough and providing an equilization of the pressure differential effect on opposite sides of said piston means caused by the connection of said second valve member to one side thereof.

7. A valve according to claim 4, wherein said chamber means includes a further passageway connecting the side of said piston means remote from said second valve member to said passageway means adjacent said outlet port.

* * * * *